United States Patent [19]

Fogelberg

[11] 4,253,914

[45] Mar. 3, 1981

[54] FEEDING DEVICE

[75] Inventor: Bengt I. Fogelberg, Nyköping, Sweden

[73] Assignee: Aktiebolaget Atomenergi, Stockholm, Sweden

[21] Appl. No.: 869,266

[22] Filed: Jan. 13, 1978

[30] Foreign Application Priority Data

Jan. 14, 1977 [SE] Sweden .................... 7700389

[51] Int. Cl.² ............................................ G21C 17/00
[52] U.S. Cl. .................................. 176/87; 176/19 R; 191/12.2 R
[58] Field of Search ................. 176/19 R, 19 J, 36 W, 176/87; 191/12.2 R, 12.2 A

[56] References Cited

U.S. PATENT DOCUMENTS

| | | | |
|---|---|---|---|
| 1,977,347 | 10/1934 | Namet | 191/12.2 R |
| 2,496,785 | 2/1950 | Finneburgh et al. | 191/12.2 R |
| 2,750,492 | 6/1956 | Young | 191/12.2 R |
| 3,144,218 | 8/1964 | Tepe | 119/12.2 A |
| 3,183,301 | 5/1965 | Kompanek et al. | 191/12.2 R |
| 3,743,796 | 7/1973 | Rosencranz | 191/12.2 A |
| 3,860,824 | 1/1975 | Stone | 176/19 R |

FOREIGN PATENT DOCUMENTS

| | | | |
|---|---|---|---|
| 1304183 | 8/1962 | France | 191/12.2 R |
| 721817 | 12/1972 | Italy | 191/12.2 R |
| 1191038 | 5/1970 | United Kingdom . | |
| 1213037 | 11/1970 | United Kingdom . | |
| 504272 | 3/1976 | U.S.S.R. | 191/12.2 R |

OTHER PUBLICATIONS

IBM Technical Disclosure Bulletin, vol. 14, No. 6 (11/71) p. 1845.

*Primary Examiner*—S. A. Cangialosi
*Attorney, Agent, or Firm*—Burns, Doane, Swecker & Mathis

[57] ABSTRACT

Device for insertion and withdrawal of an electrically connected instrument in a deep channel, comprising a flexible cable-like member, one end of said member to be inserted being connected to the instrument and the other end of said member being permanently fixed and permanently electrically connected, and means for inserting said member and the associated instrument into said deep channel, a collecting means arranged in connection with the other end of the cable-like member in which said member can be deposited in the form of a helix when withdrawing the instrument from the channel, and a feeding means for insertion into and withdrawal from the channel of said cable-like member, said feeding means being arranged in such a manner as to permit rotation of the cable-like member during the feeding thereof in view of the permanent attachment of its said other end.

5 Claims, 1 Drawing Figure

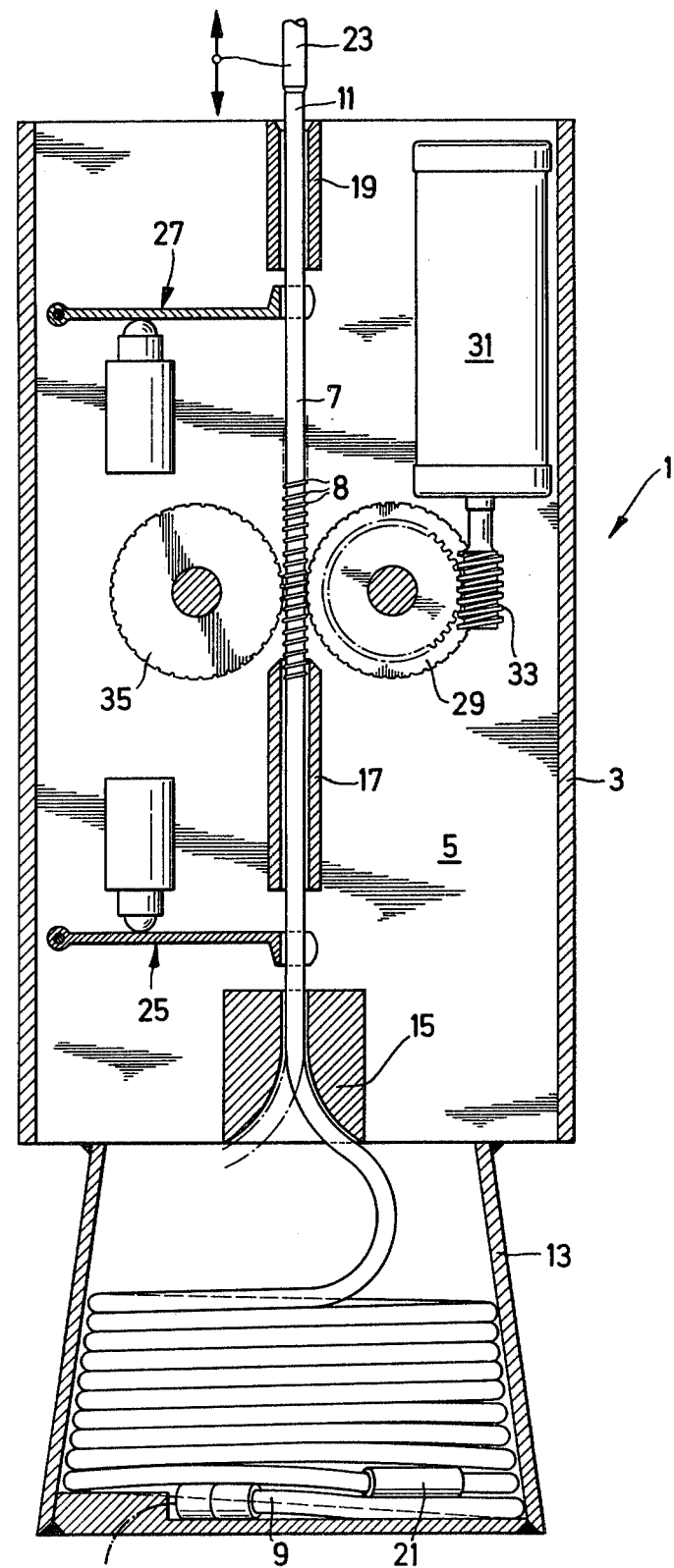

FEEDING DEVICE

The present invention relates to a device for insertion and withdrawal of an electrically connected instrument in a deep channel, for example a tube inserted into the fuel hearth of the nuclear reactor.

The technique of this invention is applicable everywhere where it is necessary to insert electrically connected instruments into deep channels, but for the sake of simplicity the invention will be described in connection with its application within the nuclear reactor area.

In order to measure a neutron flux within the hearth of a nuclear reactor a so-called neutron flux measuring instrument is used. The sensor of the detector is positioned at a site of observation having a fixed or variable position in the reactor hearth. The electric current generated by the radiation in the reactor is transferred from the sensor through an insulated conduit to a registering instrument. The neutron flux detector and the conduit are positioned in a tube extending into the hearth and closed at the inner end thereof. In this tube the sensor can be moved up to the site of observation. Usually there are several neutron flow detectors in associated tubes in the hearth, the conditions with regard to neutron radiation in the different parts of the hearth being observable and registered. These instruments of a more or less permanent character require high resistance towards the neutron radiation and they are dimensioned for operation at full power.

When measuring under particular conditions, for example thorough surveyance of the radiation conditions during the start up of a nuclear reactor, more sensitive instruments are, however, required. The higher sensitivity will, however, mean that the instruments cannot be permanently installed under full operation of the nuclear reactor. Thus, such more sensitive instruments must be extractable from the reactor core in a simple manner.

According to the prior art the probe or sensor is inserted by means of a rigid machine element, for example a rack, up into the channel and into the reactor core by means of a lifting machinery. Now, when the sensor after concluded measuring is lowered from the highly active part of the reactor core by means of the rack, the withdrawn section of the rack will take a space of several meters vertically below the reactor vessel, in view of which an important transportation space for maintenance purposes will be occupied. In view of the fact that the sensor must be electrically connected the electric conduit will depend doubled from the lower end of the rack down into the transportation space below the reactor vessel when the rack is wholly inserted into the channel. The disadvantage of the prior art for lifting and lowering the sensor is thus on the one hand based on the fact that a large space vertically is required below the reactor vessel, secondly the fact that the extracted rack constitutes a bothersome blockage of the space important to maintenance and transportation below the reactor vessel.

The problem underlying this invention is thus the provision of a device whereby the space requirement in connection with the space outside the deep channel, into which an electrically connected instrument shall be insertable, will be minimized at the same time as movable exterior electrical connection will be avoided, such connection otherwise leading to non-desirable drops in voltage and concomitant erroneous recordings. For this purpose the device of this invention comprises a flexible cable-like member enclosing the insulated conduit, one end of said member to be inserted being connected to the instrument and the other end of said member being permanently fixed where also the conduit is permanently electrically connected. Moreover, the device of the invention comprises means for inserting the cable-like member and the associated instrument into said deep channel.

The characterizing feature of the invention is a collecting means arranged in connection with the other end of the cable-like member in which said cable-like member can be deposited in the form of a helix when withdrawing the instrument from the channel, and a feeding means for insertion into and withdrawal from the channel of said cable-like member. Said feeding means is arranged in such a manner as to permit rotation of the cable-like member during the feeding thereof in view of the permanent attachment of its other end. Feeding of the cable-like member from the helix arrangement in the collecting means will thus, in view of the permanent attachment of the other end, result in rotation of the cable-like member one full revolution for each turn removed from the helix.

The collecting means suitably consists of a container open to the channel and having a circular cross-section. In a particularly preferred embodiment of the device of the invention said collecting container is conically tapering towards the open end, whereby sticking of the cable-like member to the inner walls of the container during the feeding into the container will be avoided, a closely packed helix being instead obtained. The inclination of the wall of the container is suitably at least about 5 degrees.

The cable-like member is suitably provided with means increasing the exterior friction, for example annular spaced ribs. It is particularly suitable to use as the cable-like member a densely wound helical spring sold for other purposes under the name Bowden or Teleflex cable. By using a multi-wire spring, having for example three thin wires and one coarse wire, there is obtained an exterior helical rib which can engage with the feeding means. The feeding means suitably consists of a driving toothed wheel, the engagement of which is ensured by an idle counter-wheel. This driving toothed wheel is provided with teeth which are obliquely extending in a manner corresponding to the pitch of the helical rib of the cable.

When using such exterior helical rib for improving the engagement with the feeding means it is preferred that the other end of the cable is circumferentially attached to the collecting means in such a manner that the superposed screw-feeding resulting from the engagement of the rib in connection with the rotation of the cable is added to the principal feeding provided by the feeding means. In this way torsional stresses are avoided in the cable in the area adjacent to the part of the cable deposited in the collecting container.

In order to delimit the feeding of the cable-like member in both directions said member is suitably provided with enlargements at the ends thereof cooperating with fixed limit switches.

The invention will in the following be described further by an exemplifying embodiment in connection with the appended drawing which diagrammatically and partly in section shows a preferred embodiment of the device of the invention.

The device shown on the drawing, generally designated 1, comprises a casing 3, which may have a cylindric or square cross section. Within this casing 3 a vertically extending plate 5 is arranged carrying the different parts of the device. The cable-like element is in this embodiment a multi-wire helical spring or cable 7, the lower end 9 of which is fixed and the other end 11 of which carries an instrument not shown, for example the sensor of a neutron flux detector. Cable 7 is provided with an exterior helical rib 8 which is shown diagrammatically on the drawing only in the area of the feeding means.

At the lower end in association with casing 3 and plate 5 a collecting container 13 is provided which has a conical taper and is provided with a bottom plate whereas it is open at the upper end. In connection to the open upper end of collecting container 13 a funnel-shaped guiding member 15 is arranged, whereas inside and at the upper end of casing 3 there are provided guiding tubes 17 and 19, respectively. Moreover, cable 7 is provided with enlargements 21, 23, one of the enlargements 21 being positioned at some distance from the place of attachment of said one end 9 of the cable, the other enlargement 23 being positioned at a suitable distance from the instrument (not shown) at the other end of the cable. These enlargements 21, 23 cooperate with limit switches 25 and 27, respectively, for a purpose to be closer described below.

Furthermore, the device comprises a driving toothed wheel 29 driven by a pneumatic motor 31 through a gear 33. This driving toothed wheel 29 is provided with obliquely extending teeth corresponding to the pitch of the helical rib 8. Opposite to toothed wheel 29 a counteracting idle toothed wheel 35 is arranged which is provided with corresponding obliquely extending teeth.

The function of the device when operating is briefly the following. It is assumed that the device shown on the drawing is positioned in the space below a reactor vessel and that it is desirable to insert the sensor for neutron flux measurement in a tube extending into and through the reactor hearth enclosed at the upper end. It is also assumed that the casing 3 of the device is tightly joined to said tube intended for the passage of the sensor whereby contamination of the environment will be avoided.

From the position shown on the drawing, feeding of the cable 7 is now initiated by starting the pneumatic motor 31 driving the toothed wheel 29. This will cause upward feeding of cable 7 through guiding member 15 and guiding tubes 17 and 19 so that the sensor will be moved upwardly in the tube extending into the reactor hearth. During this feeding of cable 7 in upward direction the cable coil is dewound from the collecting container 13 in view of which by the anchorage of the end 9 in the collecting container 13 cable 7 is forced to turn one revolution for each dewound coil turn. This rotation is made possible by sliding of the tooth engagement between toothed wheels 29 and 33 and the helical rib 8 of cable 7.

When the feeding has continued to such an extent that enlargement 21 has passed guiding member 15 and has come into engagement with limit switch 25 the feeding is automatically stopped in any suitable manner not shown, the sensor of the neutron flux detector being in a position suitable for measurement. After concluded measurement feeding is performed in the opposite direction by reversing the direction of rotation of the pneumatic motor 31, the feeding being stopped when the upper enlargement 23 has come into engagement with limit switch 27. Now cable 7 has again been deposited in the form of a coil inside the collecting container 13.

The reason why it is advantageous to use an upwardly tapering conical collecting container 13 has to do with the feeding of the cable out of the guiding member 15. In view of the relative rigidity of cable 7 it will when moved down into the collecting container 13 come to a somewhat too early engagement with the inner wall of collecting container 13, whereby in view of the friction it sticks to the wall so that a closely packed coil will not be obtained. However, in view of the taper of collecting container 13 this inconvenience will be avoided in view of the fact that due to the downward widening of the container the teleflex cable finds enough space to come to close engagement with the immediately preceding turn. In a straight collecting container this condition would not be obtainable but cable 7 would have to slide against the inner wall of collecting container 13 circumferentially which, in view of the friction and the rigidity of cable 7, is possible only under very favourable conditions with regard to the friction.

The advantages obtained by the device of this invention are obvious. The most pronounced advantage is the fact that the device provides for an extremely high saving of space in connection with the feeding out area from the deep channel. This saving of space is, of course, particularly important in connection with application in nuclear reactors, particularly since the compactness of the device offers highly simplified technique regarding encapsulation so that spreading of radioactive materials is avoided.

It is particularly to be noted that the device according to this invention enables the use of a fixed electrical connection at the outer end 9 of the cable and the conduit, whereby the voltage drops arising when using movable electric connections are avoided.

The invention is in no way delimited to the embodiment described above which can be modified in several ways. Thus, the feeding of cable 7 can be provided in any manner, for example by using different types of friction rolls for the feeding, and it is not necessary to use an exterior rib 8 or the like. The feeding can be provided by means of an electric motor, but the use of a pneumatic motor is preferred in view of the operational reliability of such motor in the moist environment and in view of the radioactive radiation when using the device in nuclear reactors.

What is claimed is:

1. Device for insertion and withdrawal of an electrically connected instrument in a deep channel, comprising a relatively rigid cable-like member, one end of said member to be inserted being connected to the instrument and the other end of said member being permanently fixed and permanently electrically connected, and means for inserting said member and the associated instrument into said deep channel, characterized by a collecting container open towards the channel, said container having a continuous conical taper of at least 5° towards the open end whereby said member can be deposited in the form of a closely packed helix when withdrawing the instrument from the channel, and a feeding means for insertion into and withdrawal from the channel of said cable-like member, said feeding means being arranged in such a manner as to permit rotation of the cable-like member during the feeding thereof in view of the permanent attachment of its said other end, and wherein said other end of the cable-like member is circumferentially attached to the collecting container at an end remote from said open end in such a manner that the superposed feeding resulting from the rotation of the cable-like member is added to the principal feeding, whereby torsional stresses in the cable-like member in the area adjacent to the part of the cable-like member deposited in the collecting container are avoided.

2. A device according to claim 1, characterized in that the cable-like member consists of a multi-wire spring having an exterior helical rib engaging with the feeding means.

3. A device according to claim 2, characterized in that the feeding means consists of a driving toothed wheel, the engagement of which is ensured by an idle counter-wheel.

4. A device according to claim 1, characterized in that the cable-like member adjacent to the ends thereof is provided with enlargements cooperating with fixed limit switches for interrupting and delimiting the feeding in the respective directions.

5. A device according to claim 1 in combination with a nuclear reactor.

* * * * *